US006814401B2

(12) United States Patent
Takada

(10) Patent No.: US 6,814,401 B2
(45) Date of Patent: Nov. 9, 2004

(54) VEHICLE PART MOUNTING STRUCTURE

(75) Inventor: Masahide Takada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/656,066

(22) Filed: Sep. 5, 2003

(65) Prior Publication Data

US 2004/0056516 A1 Mar. 25, 2004

(30) Foreign Application Priority Data

Sep. 6, 2002 (JP) ....................................... 2002-261679

(51) Int. Cl.[7] .......................... B60R 27/00; E05B 15/02

(52) U.S. Cl. .................................. 296/202; 292/341.18

(58) Field of Search ............................ 296/202, 203.03, 296/187.01, 187.03, 29, 30, 193.01, 193.02, 193.05, 193.06; 292/340, 341.14, 216, 341.18, 341.19, DIG. 53, DIG. 64

(56) References Cited

U.S. PATENT DOCUMENTS

| | | | | | |
|---|---|---|---|---|---|
| 3,006,677 A | * | 10/1961 | Royalty | ................. | 292/341.18 |
| 4,323,271 A | * | 4/1982 | Taniguchi | .............. | 292/341.18 |
| 5,118,151 A | * | 6/1992 | Nicholas et al. | ....... | 292/341.19 |
| 6,257,632 B1 | * | 7/2001 | Jung et al. | ............. | 292/341.18 |
| 6,511,120 B1 | * | 1/2003 | Mitts | .......................... | 296/202 |
| 2004/0119300 A1 | * | 6/2004 | Strable et al. | ......... | 292/341.18 |

FOREIGN PATENT DOCUMENTS

| | | | | |
|---|---|---|---|---|
| JP | 359059520 | * 4/1984 | ................. | 296/202 |
| JP | 362083250 | * 4/1987 | ................. | 296/202 |
| JP | 362261526 | * 11/1987 | ................. | 296/202 |
| JP | 402041982 | * 2/1990 | ................. | 296/202 |
| JP | 2001152712 A | 6/2001 | | |

* cited by examiner

*Primary Examiner*—D. Glenn Dayoan
*Assistant Examiner*—H. Gutman
(74) *Attorney, Agent, or Firm*—Merchant & Gould, P.C.

(57) ABSTRACT

A mounting structure for a retainer for mounting a vehicle door lock striker is provided. A panel constituting part of a vehicle body is formed on its first side with a retainer receiving recess for receiving a fitting protrusion of a first end portion of the retainer. The first end portion of the retainer is immovably supported by the receiving recess. A second end portion of the retainer is fixed to a fixing area of the panel by spot welding.

3 Claims, 8 Drawing Sheets

VEHICLE PART MOUNTING STRUCTURE

FIELD OF THE INVENTION

The present invention relates to an improved art of vehicle part mounting structures for parts such as door lock strikers to vehicle bodies.

BACKGROUND OF THE INVENTION

For parts to vehicle bodies, a mounting structure for door lock strikers or the like involving position adjustment during assembly is known (e.g., see JP-A-2001-152712).

This door lock striker mounting structure will be described with reference to FIGS. 9A and 9B.

Referring to FIGS. 9A and 9B, the mounting structure includes a body panel 105 and a reinforcing plate 101 mounted to the rear surface of the body panel 105. The reinforcing plate 101 has a retainer 103 with a first nut 102 mounted to its rear surface and a second nut 104. A part of the retainer 103 is attached to the rear surface of the reinforcing plate 101.

The retainer 103 has a striker positioning portion 106 with the first nut 102 welded thereto, a pair of left and right plastically deformable portions 107, 107 extending from the striker positioning portion 106 toward the second nut 104, and a fixed portion 109 connected between the distal ends of the plastically deformable portions 107, 107 via bridging portions 108, 108. The fixed portion 109 is welded to the reinforcing plate 101 to mount one end of the retainer 103 to the reinforcing plate 101.

The mounting and adjusting operation of a striker 111 is performed as described below. First, the striker 111 is put onto the surface of the body panel 105, and bolts 112, 112 are loosely screwed into the first and second nuts 102, 104 for tentative fastening. Then, the engagement between a latch (not shown) mounted to a door and the striker 111 being checked, the striker 111 is hit with a hammer to deform the plastically deformable portions 107, 107, and thereby to adjust the position of the striker 111. Thereafter the bolts 112, 112 are fully tightened to complete the operation.

The retainer 103 is swingingly displaceable in a direction across the two sides of the body panel 105 with the fixed portion 109 as a swinging base end. When the bolts 112, 112 are screwed into the nuts 102, 104, the screwing forces cause a first end portion of the retainer 103 to move away from the bolts 112, 112 in the direction of arrow X1. To prevent this, it is required to press down the retainer 103 during bolting operation, resulting in reduced workability.

Further, the member for mounting the striker 111 to the body panel 105 requires the reinforcing plate 101, the retainer 103 with the first nut 102, the second nut 104 and the bolts 112, 112, resulting in a large number of components and a complicated structure.

Thus, a vehicle part mounting structure with good workability, a small number of components and a simplified configuration is desired.

SUMMARY OF THE INVENTION

According to the present invention, there is provided a vehicle part mounting structure, which comprises: a panel constituting part of a vehicle body; a retainer mounted to a first side of the panel and having at least one female thread; at least one bolt screwed into the female thread from a second side of the panel; and a part mounted to the second side of the panel via the bolt, the retainer having a first end portion mounted to the first side of the panel by a fitting structure, and a second end portion mounted to a fixing area of the panel by spot welding, the fitting structure including a retainer receiving recess set back from the first side of the panel toward the retainer, a retainer inserting aperture opening from the retainer receiving recess toward the fixing area, and a fitting protrusion formed at the first end portion of the retainer, the fitting protrusion being inserted into the retainer inserting aperture and fitted into the retainer receiving recess.

The fitting protrusion as the first end portion of the retainer is inserted into the retainer inserting aperture and fitted into the retainer receiving recess. The fixed portion as the second end portion of the retainer is put on the first side of the panel and fixed to the fixing area of the panel by spot welding or the like. Movement of the first end portion of the retainer is restricted by the retainer receiving recess. That is, the fitting structure of the fitting protrusion and the retainer receiving recess can prevent the first end portion of the retainer from being displaced in a direction away from the bolt. This eliminates the need for pressing down the retainer during bolting operation, resulting in good workability.

Further, the member for mounting the striker to the panel only requires the single retainer with the female thread and the bolt, resulting in a small number of components and a simplified structure.

Preferably, the retainer has a plastically deformable weak portion between the second end portion and the female thread. The deformable weak portion of the retainer is easily deformed during the adjustment of position of the striker, facilitating the adjusting operation.

In a preferred form, the mounted part comprises a striker.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
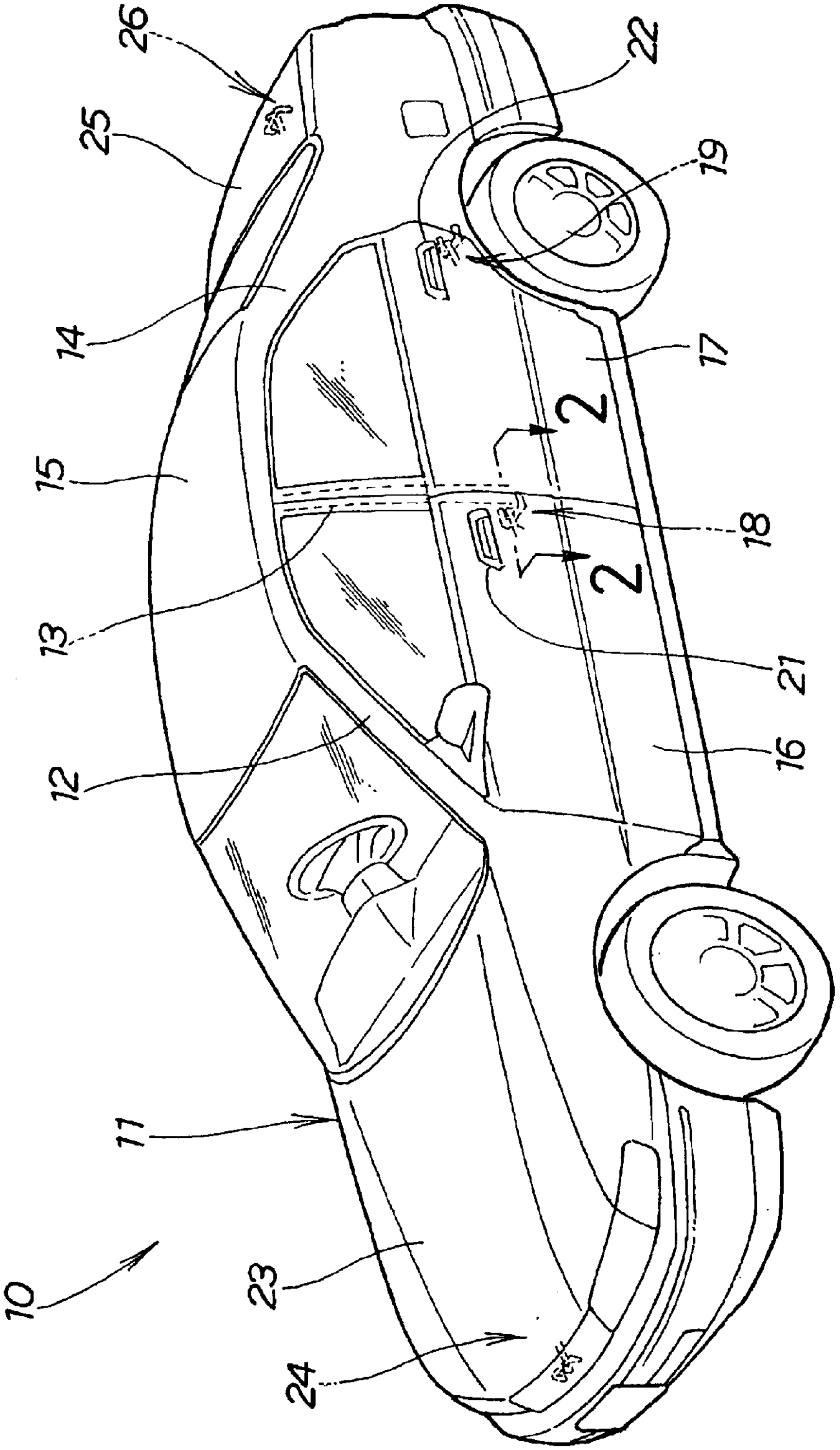
FIG. 1 is a perspective view of a vehicle with a door lock device according to the present invention.

A vehicle 10 shown in FIG. 1 has a vehicle body 11 with front pillars 12, center pillars 13, rear pillars 14 and a roof 15. The vehicle 10 also has left and right front side doors 16 (only the left door is shown) and left and right rear side doors

17 (only the left door is shown), being of the four-door type. The front side doors 16 and rear side doors 17 are locked by door lock devices 18, 19, respectively.

In the figure, reference numerals 21, 22 denote door-knobs. 23 denotes a hood. 24 denotes a hood lock device. 25 denotes a trunk lid, and 26 a lid lock device.

Figure 2:
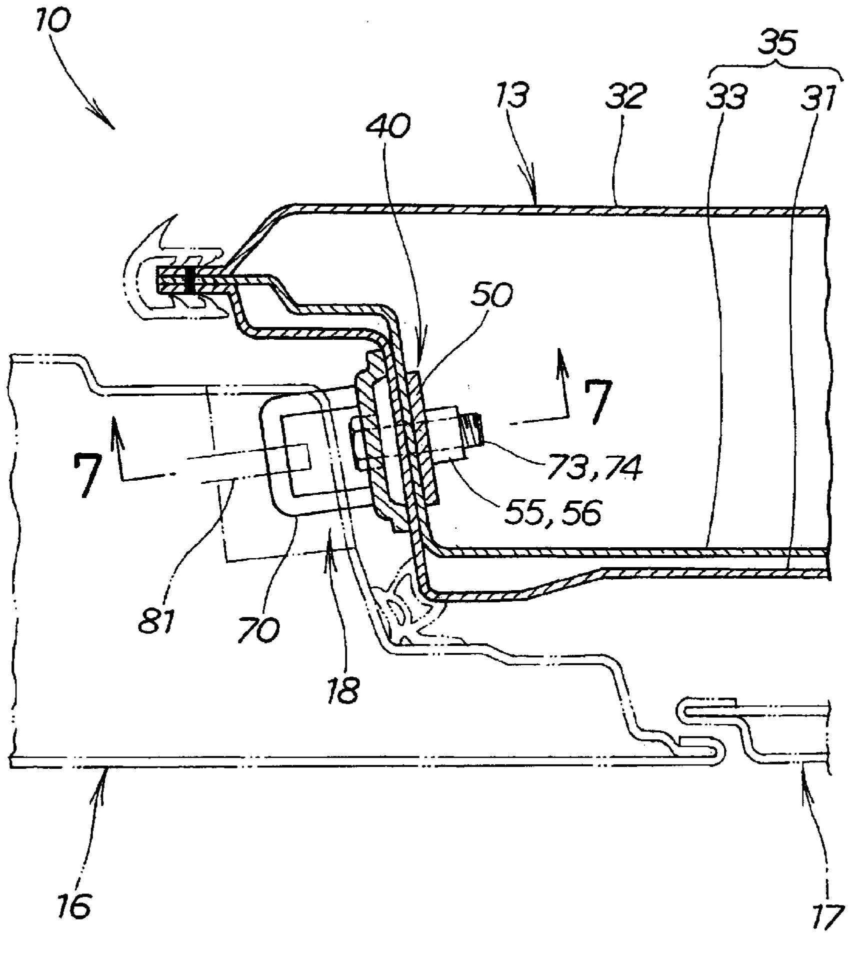
FIG. 2 is a cross-sectional view taken along line 2—2 in FIG. 1.

FIG. 2 illustrates the relationship between the center pillar 13 and the door lock device 18 of the front side door 16.

The center pillar 13 has a closed cross-section body consisting of an outside panel 31 at the vehicle outside and an inside panel 32 at the vehicle inside. A reinforcing panel (stiffener) 33 is provided within the closed cross-section body. The outside panel 31 and the reinforcing panel 33 constitute a single panel 35.

The door lock device 18 has a striker 70 mounted to the center pillar 13 and a latch 81 mounted to the door 16. The striker 70 is mounted to an opening-side portion of the center pillar 13 by a mounting structure 40.

Figure 3:
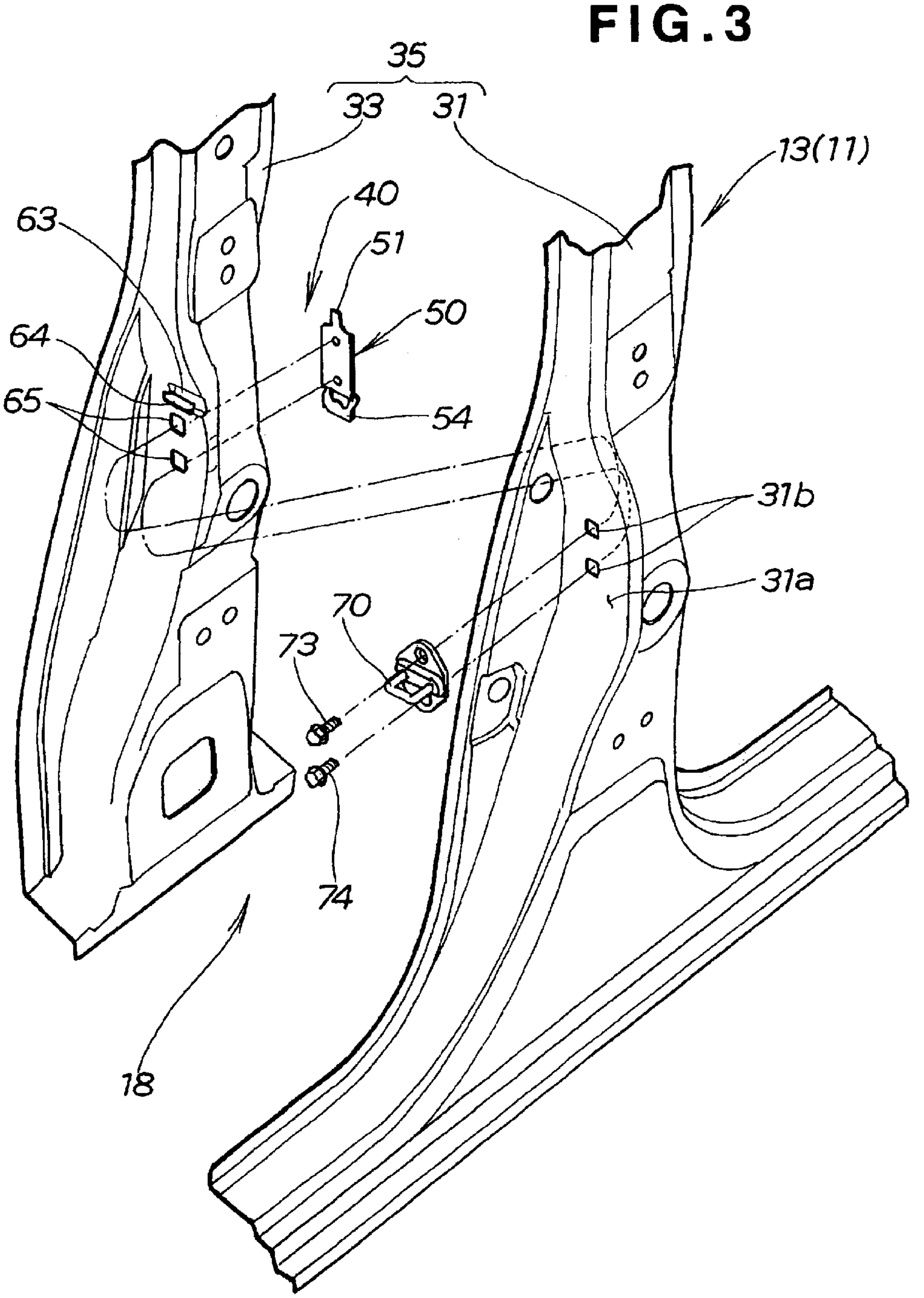
FIG. 3 is an exploded perspective view of a center pillar and the door lock device shown in FIG. 2.

FIG. 3 illustrates the center pillar 13 and the door lock device 18. The striker 70 is mounted to an external surface of the outside panel 31. A retainer 50 in the mounting structure 40 is mounted to a rear surface of the reinforcing panel 33.

Figure 4:
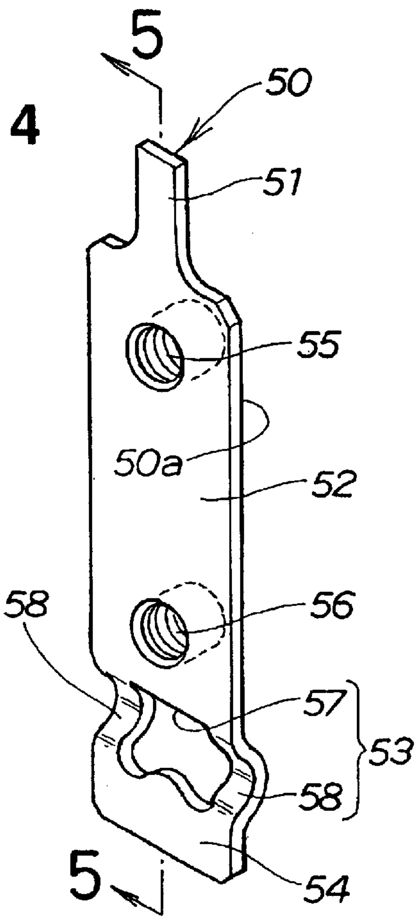
FIG. 4 is a perspective view of a retainer shown in FIG. 3.
Figure 5:
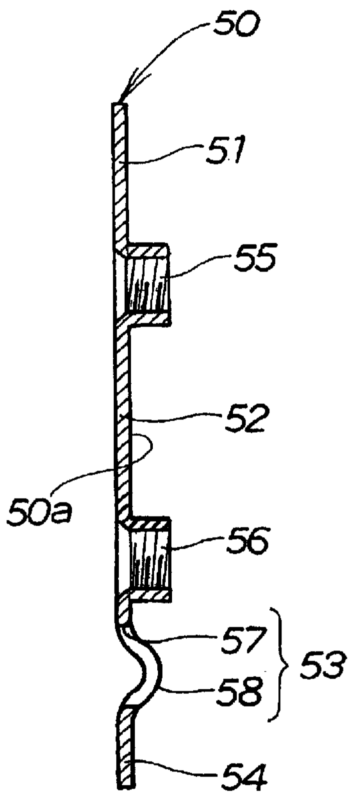
FIG. 5 is a cross-sectional view of the retainer taken along line 5—5 in FIG. 4.

Reference is now made to FIGS. 4 and 5 illustrating the retainer 50.

The retainer 50 is a press-molded single-piece component of a vertically elongated flat steel plate, including a fitting protrusion 51 formed at a longitudinal first end portion, a longitudinal base plate 52 extending downward from the fitting protrusion 51, a deformable weak portion 53 extending downward from the base plate 52, a fixed portion 54 at a second end portion extending downward from the deformable weak portion 53, and upper and lower two female threads 55, 56 provided in the base plate 52.

The fitting protrusion 51, base plate 52 and fixed portion 54 are aligned in the same plane. The fitting protrusion 51 is an elongated plate narrower than the base plate 52.

The deformable weak portion 53 is an easily plastically deformable portion, being provided between the fixed portion 54 and the female thread 56. The deformable weak portion 53 includes, for example, a through hole 57 formed across the plate thickness at the center of the width, and bends 58, 58 formed at the laterally opposite sides of the through hole 57, protruding in the direction of the plate thickness toward a rear surface 50*a* of the retainer 50.

The two female threads 55, 56 are formed in the base plate 62 by burring, protruding in the direction of the rear surface 50*a* of the retainer 50. The female threads 55, 56 are integrally formed with the retainer 50, resulting in a reduced number of components and a simplified structure.

The female threads 55, 56 may alternatively be formed by fixing additional members of nuts to the rear surface 50*a* of the base plate 52 by welding or the like.

Figure 6:
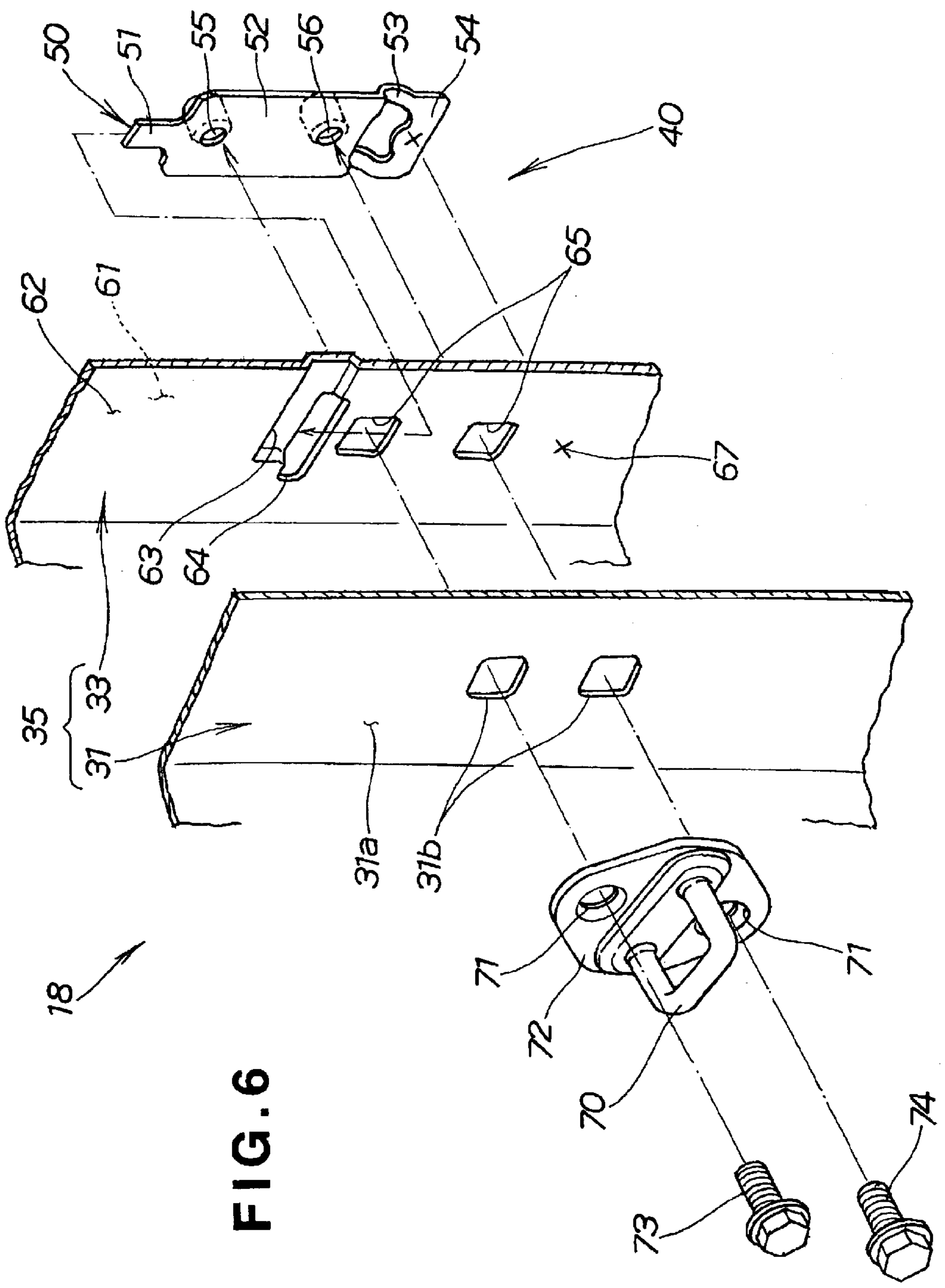
FIG. 6 is an exploded perspective view of a panel, a striker and the retainer according to the present invention.

FIG. 6 illustrates the relationship between the panel 35, striker 70 and mounting structure 40.

The retainer 50 is mounted to a first side 61 (rear surface 61) of the reinforcing panel 33 constituting a part of the vehicle body, the striker 70 is disposed on an outside surface 31*a* of the outside panel 31 located on a base plate 62 of the reinforcing panel 33, and bolts 73, 74 are screwed from the striker 70 into the female threads 55, 56 provided in the retainer 50, whereby the striker 70 is mounted to the outside panel 31.

The mounting structure 40 includes a striker mounting portion of the reinforcing panel 33, the retainer 50 and the bolts 73, 74.

More specifically, the reinforcing panel 33 is formed with a retainer receiving recess 63 set back from the first side 61 toward the retainer 50 and a retainer inserting aperture 64 opening through the retainer receiving recess 63 toward an area 67 to which the fixed portion 54 is fixed.

The striker 70 is integrally mounted to a base 72 formed with two bolt holes 71, 71. The outside panel 31 and the reinforcing panel 33 also have two bolt holes 31*b*, 31*b* and 65, 65, respectively. The bolt holes 31*b*, 31*b* and 65, 65 are much larger than the bolt holes 71, 71 of the striker 70.

The fitting protrusion 51 is inserted through the retainer inserting aperture 64 and fitted into the retainer receiving recess 63.

The process of mounting the retainer 50 to the reinforcing panel 33 will be described below. First, the fitting protrusion 51 of the retainer 50 is inserted through the retainer inserting aperture 64 and fitted into the retainer receiving recess 63. Then, the fixed portion 54 of the retainer 50 is put onto the first side 61 (rear surface 61) of the reinforcing panel 33 and spot-welded.

In this manner, the fitting protrusion 51 at the first end portion of the retainer 50 is mounted to the first side 61 of the reinforcing panel 33 by the fitting structure and the fixed portion 54 at the second end portion of the retainer 50 is mounted to the fixing area 67 on the first side 61 of the reinforcing panel 33 by spot welding or the like.

Thereafter, the reinforcing panel 33 is combined with the outside panel 31 and the inside panel 32 (see FIG. 2) to form the center pillar 13.

The combination of the outside panel 31 and the reinforcing panel 33 is hereinafter referred to simply as a "panel 35."

Figure 7:
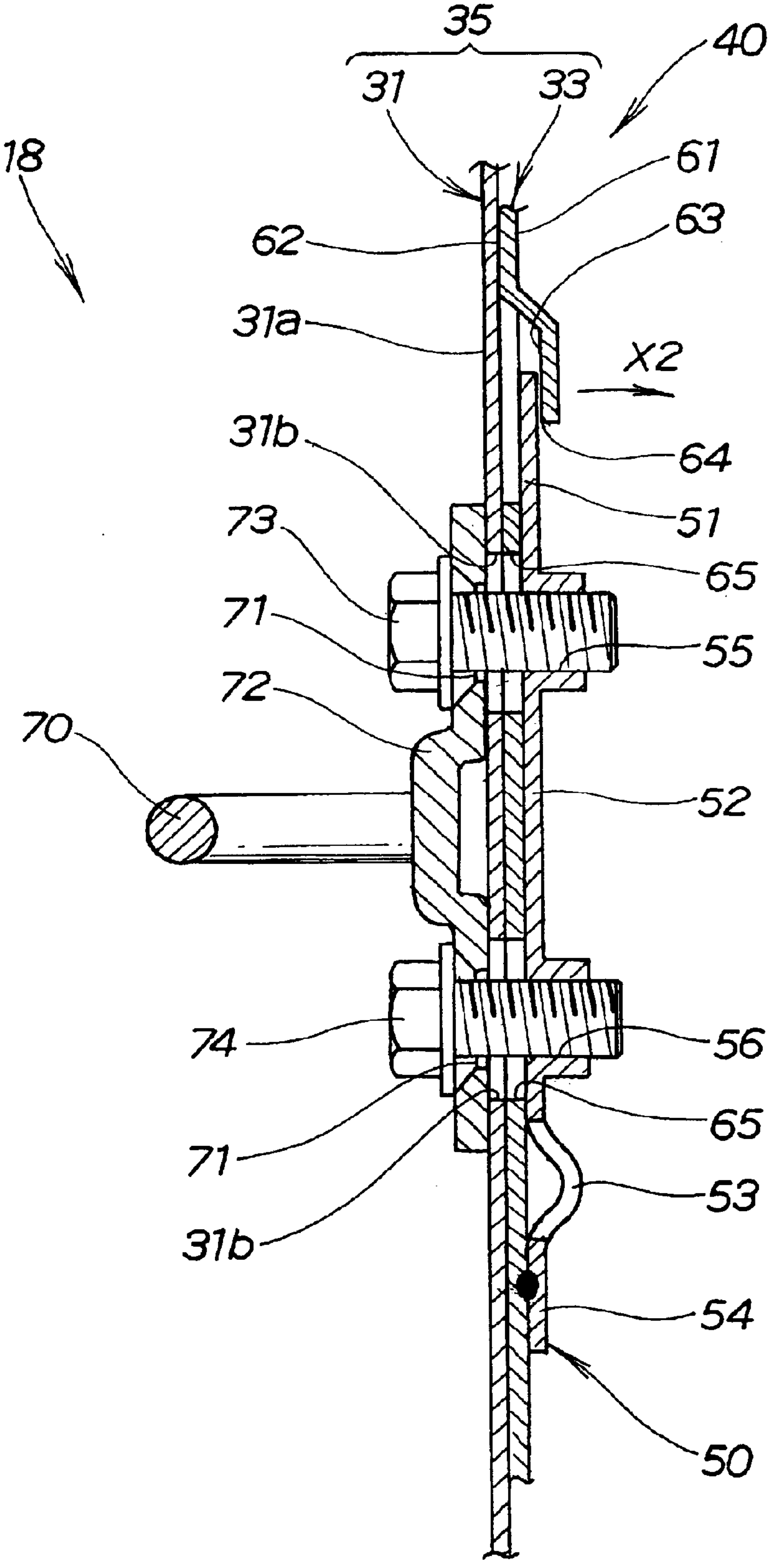
FIG. 7 is a cross-sectional view taken along line 7—7 in FIG. 2.

FIG. 7 illustrates the striker 70 mounted to the panel 35 with the mounting structure 40.

Specifically, with the reinforcing panel 33 superimposed on the outside panel 31 into the single panel 35, that is, forming the center pillar 13 (see FIG. 2), the striker 70 is put on the outside surface 31*a* of the outside panel 31, and the bolts 73, 74 are inserted from the outside surface 31*a* into the bolt holes 71, 71 and 31*b*, 31*b* and 65, 65 and screwed in the female threads 55, 56 in the retainer 50. With this, the striker 70 is mounted to the panel 35.

Now, the process of positioning the striker 70 of the above configuration will be described with reference to FIGS. 2 and 7.

First, the striker 70 is put on the outside panel 31 and the bolts 73, 74 are loosely screwed in the female threads 55, 56 in the retainer 50 for tentative fastening.

Then, the engagement between the latch 81 (see FIG. 2) mounted to the front side door 16 and the striker 70 being checked, the striker 70 is lightly hit with a hammer. As a result, the striker 70 moves in the hitting direction, causing the retainer 50 to bend in the same direction via the bolts 73, 74. Under the bending force, the deformable weak portion 53 is plastically deformed. The deformation of the deformable weak portion 53 allows position adjustment of the striker 70. Thereafter the bolts 73, 74 are fully tightened to complete the adjustment operation.

The above-described embodiment will be summarized. The retainer 50 is swingingly displaceable in a direction across the two sides of the panel 35 with the fixed portion 54 as a swinging base end. When the bolts 73, 74 are screwed from the outside surface 31*a* of the panel 35 into the female threads 55, 56 at the first side 61 of the panel 35, the screwing forces cause the first end portion of the retainer 50 to move away from the bolts 73, 74 in the direction of arrow X2 (see FIG. 7). To prevent this, it is required to press down the retainer 50 during bolting operation.

In the present invention, the fitting protrusion 51 at the first end portion of the retainer 50 is inserted through the retainer inserting aperture 64 and fitted into the retainer receiving recess 63, thereby being mounted to the panel 35, and the fixed portion 54 at the second end portion of the retainer 50 is put on the first side 61 of the panel 35 and mounted thereto by spot welding or the like, so that the moving range of the first end portion of the retainer 50 is restricted by the retainer receiving recess 63.

That is, the fitting structure formed by the fitting protrusion 51 and the retainer receiving recess 63, specifically, the fitting structure in which the fitting protrusion 51 is fitted in between the first side 61 of the reinforcing panel 33 and the bottom of the retainer receiving recess 63 prevents the displacement of the first end portion of the retainer 50 in a direction away from the bolts 73, 74. This eliminates the need for pressing down the retainer 50 during the bolting operation, increasing workability.

Further, the deformable weak portion 53 which is easily plastically deformed is formed between the female threads 55, 56 in the retainer 50 and the fixed portion 54, whereby in the position adjustment of the striker 70, the deformable weak portion 53 is easily deformed, facilitating the adjusting operation.

Furthermore, the member for mounting the striker 70 to the panel 35 only requires the single retainer 50 with the female threads 55, 56 and the two bolts 73, 74, resulting in a reduced number of components and a simplified structure.

Figure 8:
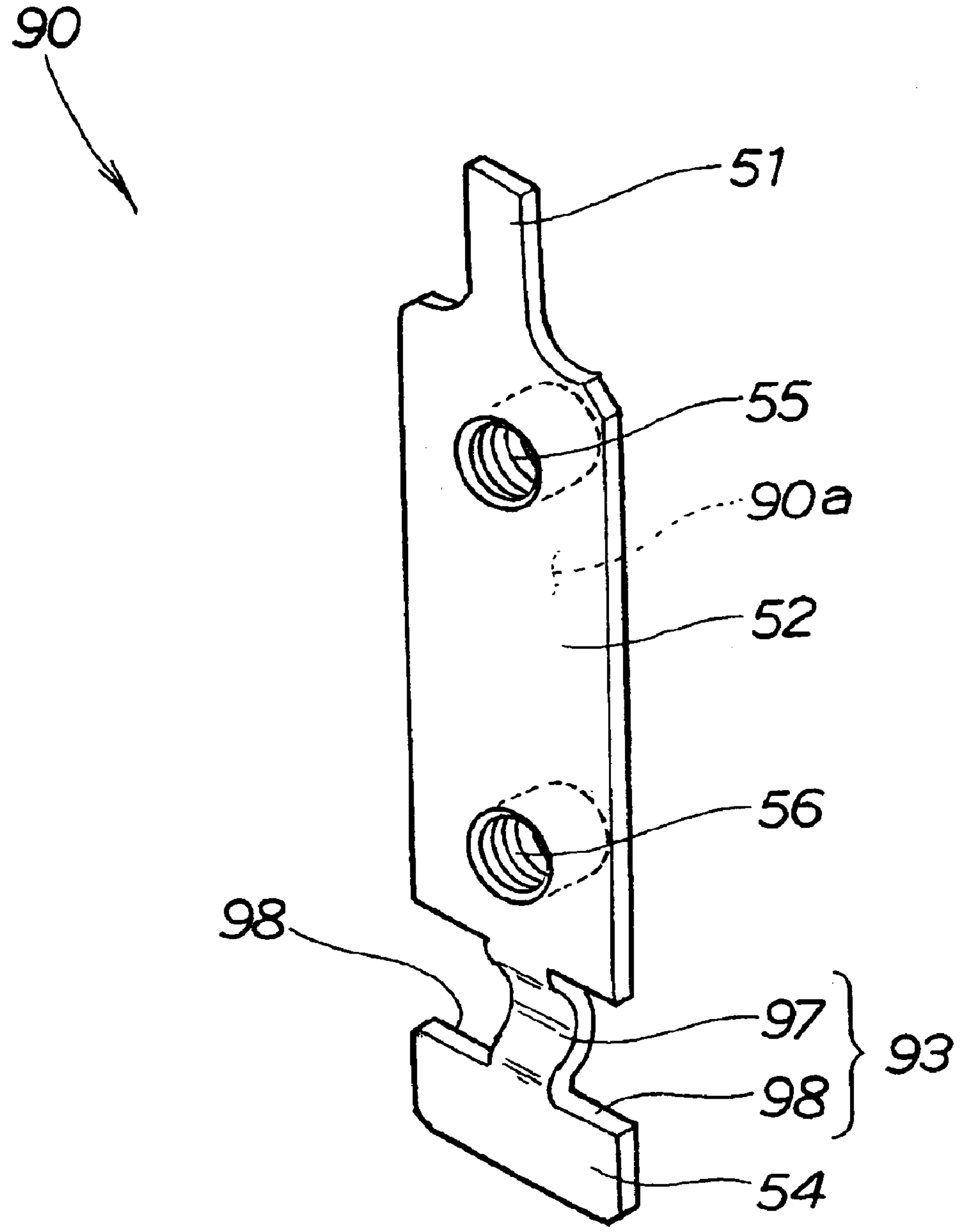
FIG. 8 is a perspective view of a modification of the retainer shown in FIG. 4.
Figure 9A:
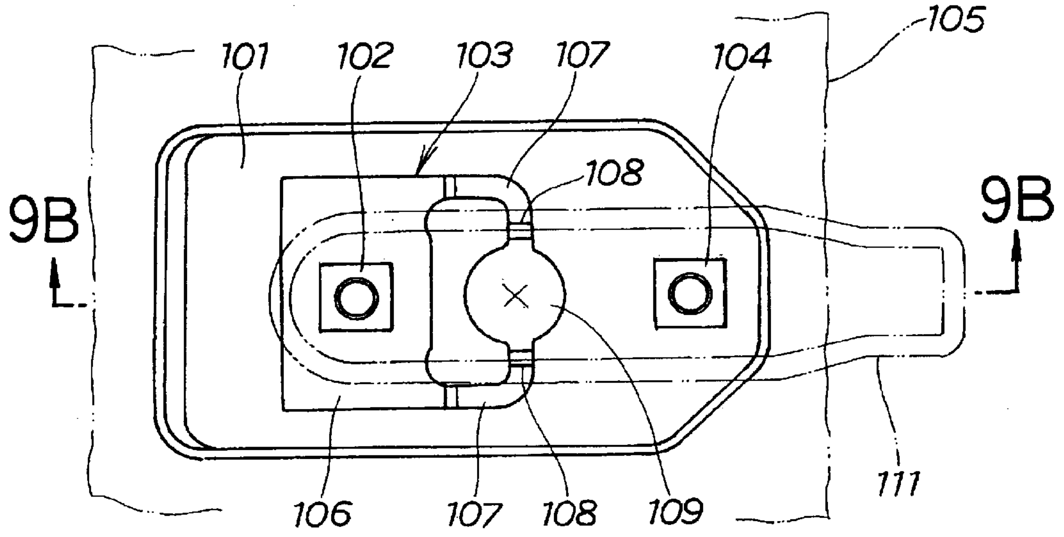
FIG. 9A (PRIOR ART)
FIG. 9A is a plan view of a conventional door lock striker mounting structure.
Figure 9B:
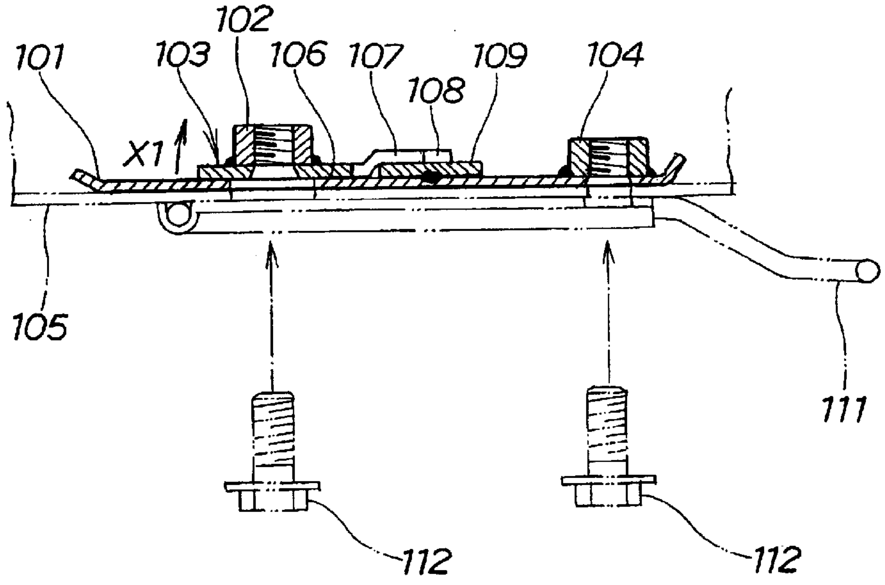
FIG. 9B (PRIOR ART)
FIG. 9B is a cross-sectional view taken along line 9B—9B in FIG. 9A.

FIG. 8 illustrates a modified retainer. A retainer 90 in this modification is modified at the deformable weak portion 53 shown in FIG. 4. A modified deformable weak portion 93 includes a bend 97 at the center of the width, bending in the plate thickness direction toward a rear surface 90*a* of the retainer 90, and notches 98, 98 formed by cutting off laterally opposite portions of the bend 97. The other components of the retainer 90 are identical with those of the retainer 50 shown in FIG. 4, being given the same reference numerals and will not be described.

The vehicle part mounting structure of the present invention is adaptable to structures for mounting various components to the vehicle body 11 and is not limited to the configuration of mounting the striker 70 to the front side door 16. The present mounting structure is adaptable to the door lock device 19 for the rear side door 17, the hood lock device 24 and the lid lock device 26 shown in FIG. 1, for example.

Obviously, various minor changes and modifications of the present invention are possible in the light of the above teaching. It is therefore to be understood that without departing from the scope of the appended claims, the invention may be practiced otherwise than as specifically described.

What is claimed is:

1. A vehicle part mounting structure, comprising:

a panel constituting part of a vehicle body;

a retainer mounted to a first side of the panel and having at least one female thread;

at least one bolt threadedly engaged with the female thread from a second side of the panel; and a part mounted to the second side of the panel with the bolt, the retainer having a first end portion mounted to the first side of the panel by a fitting structure, and a second end portion mounted to a fixing area of the panel by spot welding, the fitting structure including a retainer receiving recess set back from the first side of the panel toward the retainer, a retainer inserting aperture opening from the retainer receiving recess toward the fixing area, and a fitting protrusion provided at the first end portion of the retainer, the fitting protrusion being inserted through the retainer inserting aperture and fitted into the retainer receiving recess.

2. A vehicle part mounting structure according to claim 1, wherein the retainer has a plastically deformable weak portion between the second end portion and the female thread.

3. A vehicle part mounting structure according to claim 1, wherein the mounted part comprises a striker.

* * * * *